United States Patent

[11] 3,614,594

[72] Inventor John
P ourgh, Pa.
[21] Appl. No. ' 412
[22] Filed ıar. 11, 1970
[45] Patented Oct. 19, 1971
[73] Assigne Westinghouse Electric Corporation
Pittsburgh, Pa.
Continuation-in-part of application Ser. No. 813,074, Apr. 3, 1969, now abandoned.

[54] FORCE COMMUTATION CIRCUITS
14 Claims, 6 Drawing Figs.

[52] U.S. Cl. .......... 321/45 R, 321/5, 321/45 C
[51] Int. Cl. .......... H02m 7/48
[50] Field of Search .......... 321/5, 45, 45 C

[56] References Cited

UNITED STATES PATENTS

| | | | |
|---|---|---|---|
| 3,219,905 | 11/1965 | Davis et al. .......... | 321/45 C |
| 3,399,336 | 8/1968 | Koppelmann .......... | 321/5 |

OTHER REFERENCES

IBM Technical Disclosure Bulletin, " Switch Voltage Regulator," Vol. 6, No. 8, January, 1964, p. 31- 32, (321/45 C)

*Primary Examiner*—William M. Shoop, Jr.
*Attorneys*—F. H. Henson, C. F. Renz and A. S. Oddi

ABSTRACT: A commutation circuit is disclosed for commutating power-control switching devices, such as thyristors or silicon-controlled rectifiers, utilized for supplying a load from a DC source, wherein a commutating capacitor is operatively connected across the power control switching device to be commutated by selectively turning on commutation-controlled switching devices, which may also comprise thyristors or silicon-controlled rectifiers. Also unidirectional devices are employed to provide a circuit path for any reactive energy trapped in the load circuit during the commutation operation.

WITNESSES:
Bernard R. Giegucz
James L. Young

INVENTOR
John Rosa
BY [signature]
ATTORNEY

FORCE COMMUTATION CIRCUITS

CROSS-REFERENCE TO RELATED APPLICATION

This application is a continuation-in-part to application Ser. No. 813,074, filed Apr. 3, 1969, and now abandoned.

BACKGROUND OF THE INVENTION

1. Field of the Invention

The present invention relates to commutation circuits and, more particularly, to commutation circuits of the force commutation type.

2. Discussion of the Prior Art

A force-commutated system, as compared to a naturally commutated system, is one in which the control-switching devices, such as thyristors or silicon-controlled rectifiers, are forced to their nonconductive state by a commutation circuit separate from these devices. One type of force-commutating circuit for thyristor choppers or inverters utilizes both capacitive and inductive components which are used in combination to effect the forced commutation. The principal function of the capacitive components is to store energy which is later utilized to supply the load during commutation. The inductive components are utilized to prevent the rapid discharge of capacitance. Another common technique to utilize the inductive and capacitive components to form a resonant circuit so that by means of a ringing action these components are actively involved in the commutation operation. The size and weight of the inductive component make such design undesirable for airborne or underseas applications. In a typical inverter using forced commutation, one-half of the total weight may be due to the commutation inductors.

Another type of forced commutation circuit does not utilize inductive elements but requires a separate charging path for the commutation capacitors used. The separate charging path includes a resistive component which gives rise to substantial energy losses therein that severely limit the efficiency of the circuit.

SUMMARY OF THE INVENTION

Broadly, the present invention provides a commutation circuit wherein the commutation of controlled-switching devices is effected without requiring inductive components adding weight to the circuit or resistive components dissipating energy.

DESCRIPTION OF THE PREFERRED EMBODIMENTS

Figure 1:
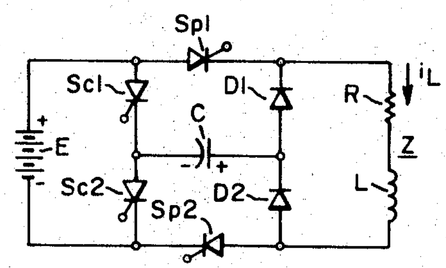
FIG. 1 is a schematic diagram of the chopper embodying the teachings of the present invention.

Referring to FIG. 1, a chopper circuit is shown wherein a load Z is supplied from a battery E through a pair of power-controlled switching devices Sp1 and Sp2, which may comprise thyristors, silicon-controlled rectifiers or other equivalent devices. By turning on the power devices Sp1 and Sp2 a series circuit is provided including the battery E and the load impedance Z, shown to include a resistor R and can inductor L, which may typically comprise the inherent inductance of the load Z. The power devices Sp1 and Sp2 should be selected to carry the desired load current $i_L$ at the voltage level employed within the circuit configuration.

Figure 2:
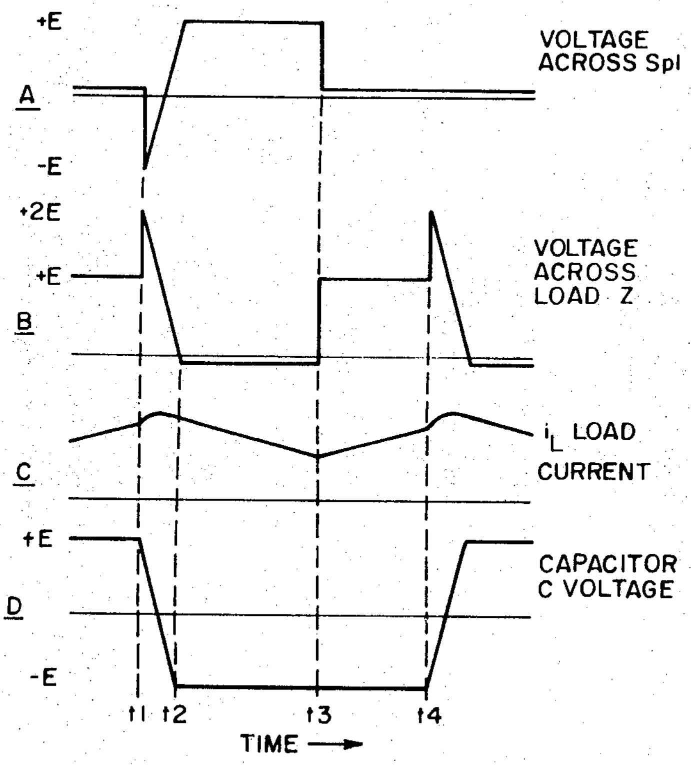
FIG. 2 is a waveform diagram used in explaining the operation of FIG. 1.

Also referring to the waveform diagram of FIG. 2 assume that at a time prior to the time $t1$ both the power devices Sp1 and Sp2 are conductive. Curve A of FIG. 2 shows the voltage across the power device Sp1. In that the device Sp1 is in its conductive state at this time, only a small voltage drop, due to the forward junction drop thereof, will appear. A substantially similar voltage drop will appear across the power device Sp2. The voltage across the load impedance Z will thus be substantially the voltage E of the battery as shown in curve B of FIG. 2. Curve C of FIG. 2 shows the load current $i_L$ which is gradually increasing approaching the time $t1$. The capacitor C at a time prior to the time $t1$ is charged as indicated on FIG. 1 and in curve D of FIG. 2 to substantially the battery voltage E.

The commutation circuit of FIG. 1 includes a pair of commutating-controlled switching devices Sc1, Sc2 the commutating capacitor C and a pair of unidirectional devices D1 and D2 shown as diodes. The commutation control switching devices Sc1 and Sc2 may comprise thyristors or silicon-controlled rectifiers having a power rating depending upon the switching frequency employed for commutation. The anode of the commutation device Sc1 is connected to the positive electrode of battery E, and the cathode of the commutation device Sc2 is connected to the negative electrode thereof. The cathode-anode connection of the device Sc1–Sc2 is connected to the left side of the capacitor C. The right side of the capacitor C is connected to the cathode-anode connection of the diodes D1 and D2, with the cathode of the diode D1 being connected to the cathode of the power device Sp1 and the anode of the diode D2 being connected to the anode of the power device Sp2.

In order to commutate the power device Sp1 at the time $t1$, the commutation device Sc1 is turned on thereby providing a conductive path from the battery E, the anode-cathode circuit of the commutation device Sc1, the capacitor C, the diode D1, the load impedance Z and the power device Sp2. With the capacitor C charged is indicated in FIG. 1 being connected in series with the load Z, the voltage across the load Z will then jump to a value substantially equal to 2E as indicated in curve B of FIG. 2. The power-switching device Sp1 will thus have a negative voltage applied from the cathode to the anode thereof thus reverse biasing this device causing it to be commutated off. The reverse bias of −E across the power device Sp1 is shown in curve A of FIG. 2.

During the time interval $t1$ and $t2$ the capacitor C charges to the opposite polarity, with the left side thereof now being positive, through the commutation device Sc1, the diode D1, the load Z and power device Sp2. At the time $t2$, as shown in curve D of FIG. 2, the capacitor will be charged to the −E voltage as indicated. At this time, the load current $i_L$ freewheels through the diodes D2 and D1 with the voltage across the load Z as shown in curve B of FIG. 2 being clamped to forward voltage drops of the diode D1 and D2. This permits the commutating device Sc1 and the power device Sp1 to recover and to be in their turned-off state and react for the next cycle of operation. The power device Sp1 is reverse biased until the capacitor voltage C reaches zero between the times $t1$ and $t2$. If capacitor C is properly sized, this time is of sufficient time length for the power device Sp1 to be turned off. The voltage across the power device Sp1 then increases to be forward biased to the battery voltage E at the time $t2$ and remains there until the time $t3$ when both power devices Sp1 and Sp2 are gated on. The time period $t2$–$t3$ is appropriately chosen so as to obtain the desired average load voltage.

To effect the commutation of the power device Sp2, at a time $t4$, the commutation-controlled switching device Sc2 is turned on. The turning on of the commutation device Sc2 causes a reverse bias to be applied across the power device Sp2. The capacitor C, with its left side positive, is connected through the commutation device Sc2 in series with the load Z and thus discharged therethrough, with the capacitor C charging to the polarity as shown in FIG. 1 via the load impedance Z and diode D2. When the capacitor C has charged to the battery voltage E, the commutation device Sc2 will recover with the load current $i_L$ freewheeling through the diodes D2 and D1. The commutation circuit is thereby reset for the next commutating cycle when the power device Sp1 will be commutated off by the turning on of the commutation device Sc1 as previously described.

The embodiment of FIG. 1 thus provides commutation of the power-switching devices Sp1 and Sp2 without the requirement of an isolating or commutating inductor. The commutating capacitor C is connected across the respective power-switching device in order to turn it off while also being placed in series with load Z so as to recharge to the opposite polarity for operation during the next commutation cycle. The circuit of FIG. 1 also does not require a separate charging resistor for the commutating capacitor C thereby providing a highly efficient chopping circuit.

Figure 3:
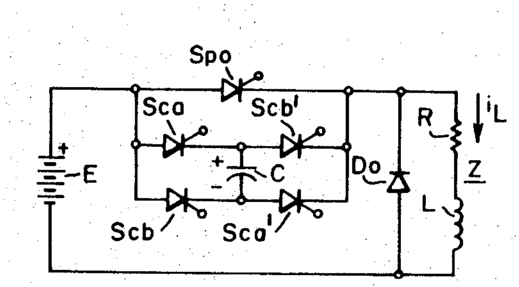
FIG. 3 is a schematic diagram of a chopper circuit employing another embodiment of the present invention.

FIG. 3 shows another embodiment of the present invention employed in a chopper circuit wherein only one power-controlled switching device Spo is utilized. This single power device Spo is connected in series between the battery E and the load Z so that a load current $i_L$ will flow through the load impedance Z. The commutating circuit for the power device Spo is shown to include four controlled-switching devices Sca, Sca', Scb and Scb'. The anodes of the devices Spo, Sca, and Scb are commonly connected, and the cathodes of the devices Spo, Scb' and Sca' are commonly connected. The commutating capacitor C is connected between the cathode-anode junctions of devices Sca-Scb' and Scb-Sca'. A freewheeling diode Do is connected across the impedance Z with the cathode thereof being connected to the cathode of the power device Spo.

Assume that the capacitor C is charged to the polarity as shown in FIG. 3 to approximately the battery voltage E. With the power device Spo conductive, the load current $i_L$ will be supplied therethrough from the battery E. In order to commutate off the power device Spo, the commutation devices Scb and Scb' are turned on. This connects the commutating capacitor C directly across the anode-cathode electrodes of the power device Spo with the cathode thereof being rendered positive with respect to the anode due to the polarity of charge on the capacitor C. The power device Spo will thus be commutated off due to the reverse bias. The capacitor C will discharge through the commutating devices Scb and Scb' and the load impedance Z and recharge from the battery E through commutating devices Scb and Scb' to the opposite polarity so that the bottom side thereof will now be positive. When the capacitor C has fully charged to substantially the battery voltage E, the load current $i_L$ will freewheel through the diode Do with the load voltage being reduced to substantially zero. Load voltage is reapplied by turning on the power device Spo at the next cycle of operation. With the commutating circuit reset for the next commutation operation, commutation devices Sca and Sca' are turned on which apply a reverse bias to the power device Spo from the commutating capacitor C thereby turning off the power device Spo. The capacitor C recharges through the commutating devices Sca and Sca' and the load Z to the polarity as shown in FIG. 3 with the devices Sca and Sca' recovering when the capacitor C has charged to substantially the voltage E thereby resetting the commutating circuit. The current freewheels through the diode Do with the load voltage going to zero and the chopper circuit being then ready for the next energizing cycle.

The circuit of FIG. 3 requires only one power switching device Spo which is rated to carry full load current but requires four auxiliary commutating devices. The circuit of FIG. 1 requires only four switching devices. Two of these must be rated for full power. The rating of the commutation devices in each of the circuits depends upon the switching frequency. If a low-switching frequency is utilized, the circuit of FIG. 3 should prove more economical since four relatively low-rated commutating devices could be utilized with the single full power device Spo. However, at higher switching frequencies, FIG. 1 should be more economical since only two high-frequency commutating devices would be required for operation at the high frequency.

Figure 4:
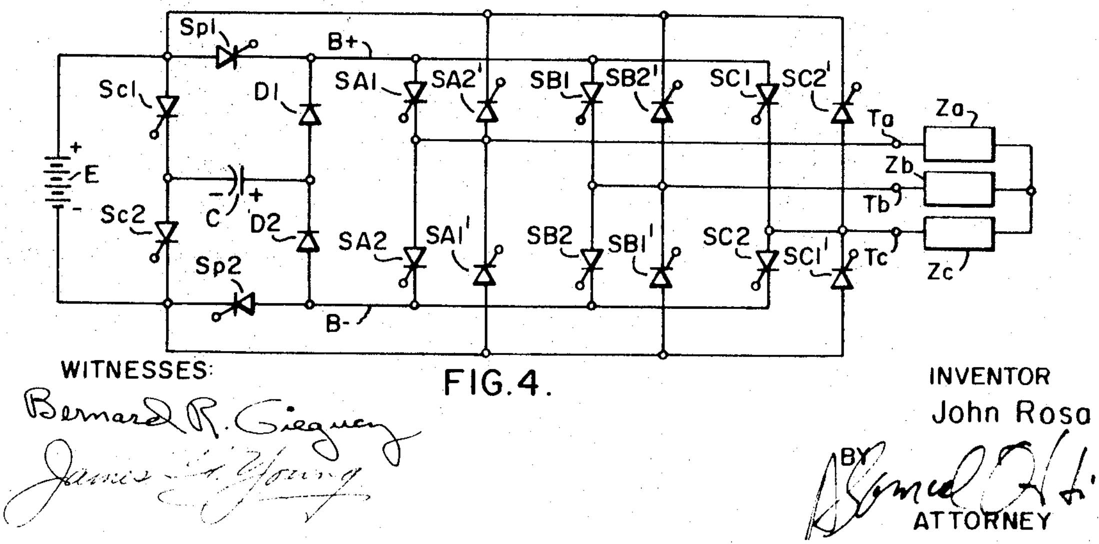
FIG. 4 is a schematic diagram of an inverter utilizing the teachings of the present invention.

FIG. 4 shows the commutation circuit of FIG. 1 being utilized with a three-phase inverter circuit. The three-phase inverter circuit is connected in a standard bridge array and includes controlled-switching devices SA1, SA2, SB1, SB2, SC1 and SC2. The anodes of the bridge devices SA1, SB1 and SC1 are connected to a B+ bus which is at the cathode of line power device Sp1. The cathodes of the bridge devices SA2, SB2 and SC2 are connected to a B− bus at the anode of the line power device Sp2. A three-phase load is provided including the impedance elements Za, Zb and Zc with one end of these elements being commonly connected and the other ends being connected to terminals Ta, Tb and Tc, respectively. The terminals Ta, Tb and Tc are connected to the cathode-anode junctions of the controlled-switching devices SA1-SA2, SB1-SB2, and SC1-SC2, respectively. A plurality of feedback control switching devices SA2', SA1', SB2', SB1', SC2' and SC1' are provided and are respectively associated with the bridge-switching devices SA1, SA2, SB1, SB2, SC1 and SC2. The anodes of the feedback devices SA1', SB1' and SC1' are commonly connected to the negative terminal of the battery E, while the cathodes of the feedback devices SA2', SB2' and SC2' are connected to the positive electrode of the battery E. The cathode-anode junction of the feedback devices SA1'–SA2bq:, SB1'–SB2', SC1'–SC2' are, respectively, connected to the terminals Ta, Tb and Tc. The inverter circuit as described is conventional except that feedback-switching devices SA1', SA2', SB1', SB2', SC1' and SC2' are utilized rather than conventional feedback diodes. By utilizing controlled switches, such as silicon-controlled rectifiers or thyristors, instead of diodes for handling the reactive power and circulating current, a short circuit discharge path for the commutating capacitor C through a bridge-controlled switching device and the complementary feedback device (e.g., SA1 and SA2') is avoided. To accomplish this, bridge-controlled switches are turned on for the entire desired conduction period except for the short time when the respective commutating-controlled switch device Sc1 or Sc2 is gated on. At these instants the complementary feedback control switch (having the same letter designation with a prime) is also fired with a short pulse. The result of this is that the feedback device can take over conduction from a bridge device, but a bridge device cannot go into conduction due to the firing of a commutating device Sc1 or Sc2 when the complementary device or its associated device is conducting which would otherwise cause a short circuit discharge of the commutating capacitor C.

Figure 5:
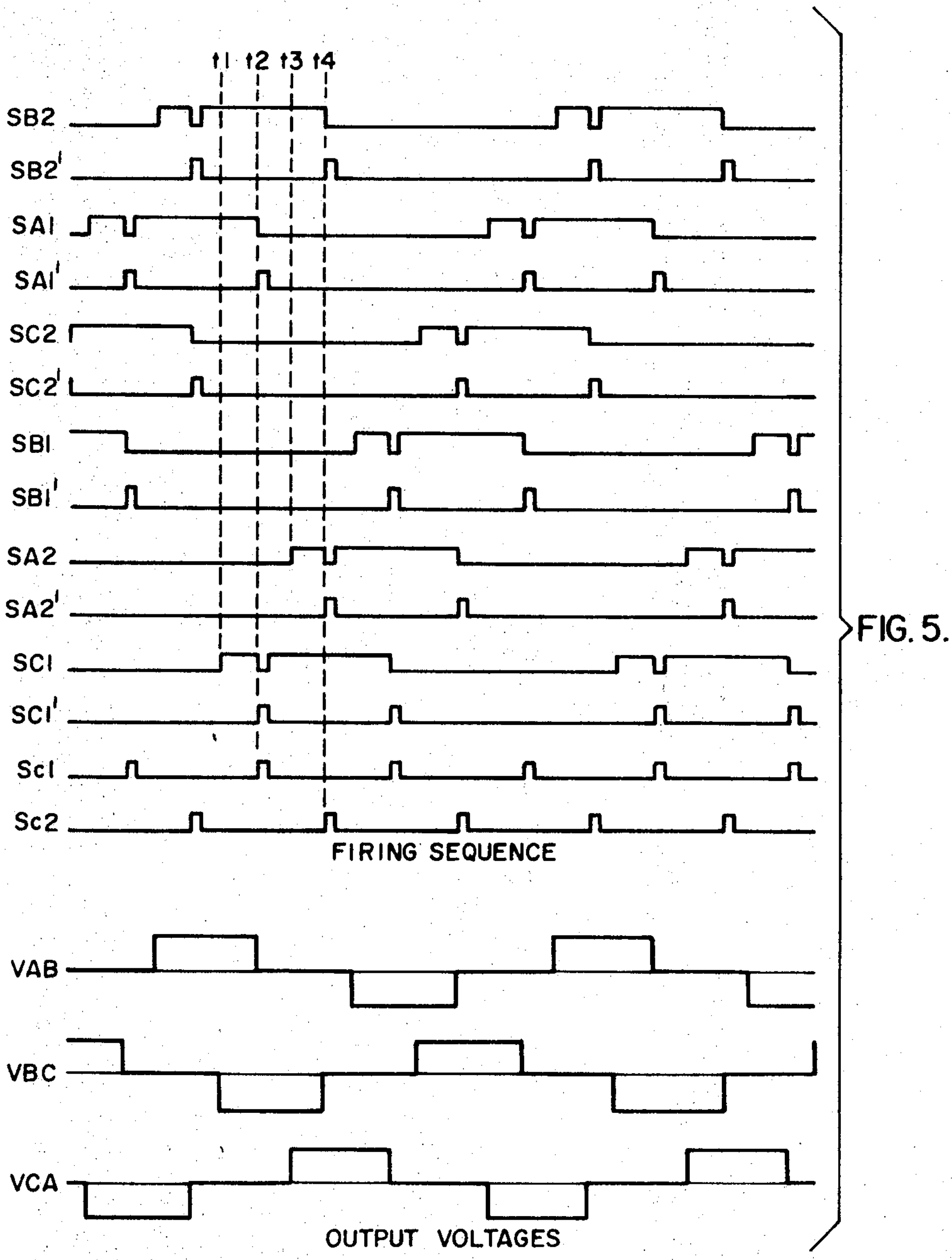
FIG. 5 is a waveform diagram used in explaining the operation of FIG. 4.

Referring now to FIG. 5 which is a waveform diagram showing the firing sequence of the various controlled switches utilized in FIG. 4 and the output voltage developed across the terminals Ta, Tb and Tc, a specific example of the mode of operation of FIG. 4 will be described.

At the time $t1$ in FIG. 5, the line power devices Sp1 and Sp2 are conductive along with the bridge devices SA1, SB2 and SC1 so that a current path is provided through these bridge devices to the impedance elements Za, Zb and Zc. At the time $t2$, it is necessary to commutate the bridge device SA1. In order to accomplish this, firing pulses are removed from the line device Sp1, the bridge device SA1 and, for a small interval of time, from the bridge device SC1. Also at the time $t2$, the commutating device Sc1 is gated on as are the complementary feedback devices SA1' and SC1' by short interval pulses as indicated by the firing sequence of FIG. 5. The line power device Sp1 is substantially instantaneously turned off by the reverse bias supply thereacross from the commutating capacitor C which had previously been charged as indicated in FIG. 4. Current flow into the B+ bus is temporary through the commutating device Sc1 and the commutating capacitor C. It should be noted that if the gate signal had not been removed from the bridge device SC1 at the time the capacitor C could instantaneously discharge through the devices SC1, SC2' and Sc1, which in certain instances, would not reverse bias the line device Sp1 for s sufficiently long time to recover. It therefore, in most instances, is desirable to take the precaution of removing the gating pulse from the device SC1 for a short interval of time. Also it should be noted that the associated feedback device SA2' to the bridge device SA2 is blocking during this time to prevent a short circuit for the capacitor C.

When the capacitor voltage has fully reversed to a polarity opposite to that shown in FIG. 4, current into the terminal Ta transfer to the feedback device SA1' which was gated on at the time $t2$. The bridge device SA1 is thus commutated and the commutating circuit is reset for the next commutating interval. The line device Sp1 is refired and the gating pulse reapplied to the bridge device SC1. This then reestablishes the operating conditions of the inverter until the period $t3$.

At the time $t3$, the bridge device SA2 is gated on and is already to take over conduction from the feedback device SA1' when current through the impedance element Za reverses.

At the time $t4$ the gate pulse is removed from the line device Sp2 and bridge devices SB2 and SA2. A short gating pulse is supplied to the commutating device Sc2 to commutate the line device Sp2 thereby with the bridge device SB2 also being commutated at this time. At the time $t4$, the feedback devices SB2' and SA2' are also fired with a short pulse in order to permit flow of reactive power therethrough to the source E. The commutating capacitor C charges through the commutating device Sc2 and the load to a polarity as shown in FIG. 4 with the commutating circuit being reset for the next commutating interval as previously described.

The commutating circuit as employed in FIG. 4 is operative to commutate the line devices Sp1 and Sp2 as well as the various bridge devices SA1, SA2, SB1, SB2, SC1 and SC2 so that the three phase voltages VAB, VBC, and VCA are developed as shown in the output voltage portion of the waveform diagram of FIG. 5.

Figure 6:
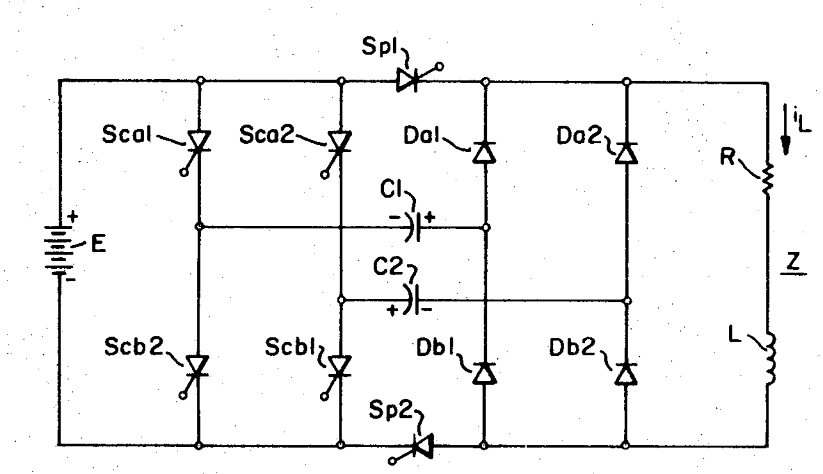
FIG. 6 is a schematic diagram of another embodiment of the present invention.

FIG. 6 shows another embodiment of the present invention wherein the power control switching devices Sp1 and Sp2 need only support one-half of the source voltage E when being commutated off as opposed to supporting the full voltage E as is in the embodiments of FIGS. 1, 3 and 4. The advantage of this is that power-switching devices may be utilized which have only approximately one-half the forward breakover rating as compared to power devices which must sustain the full source voltage E. This is accomplished in the circuit of FIG. 5 by commutating both of the power devices Sp1 and Sp2 at the same time rather than just one of the devices as shown in the embodiments of FIG. 1 and FIG. 4.

The commutation of both power devices Sp1 and Sp2 at the same time in FIG. 6 is accomplished in the following manner. Assume that both power devices Sp1 and Sp2 are conductive with a load current $i_L$ being applied through the impedance in the direction shown and that a pair of commutation capacitors C1 and C2 are charged to the indicated polarities to a voltage substantially equal to $\pm E/2$ as shown. To terminate the current flow $i_L$ through the load Z, the power devices Sp1 and Sp2 are commutated by turning on a pair of commutating-control switching devices Scal and Scb1 by the application of gating pulses to the respective gate electrodes thereof. Another pair of commutation control switching devices Sca2 and Scb2 are maintained in their nonconductive state. The commutation devices Sca1 and Sca2 are connected in series from anode to cathode between positive and negative terminals of the DC source E. The devices Sca2 and Scb2 are also connected from anode to cathode between the positive and negative electrodes of the source E. With the turning on of the commutation device Sca1, a reverse bias from the capacitor C1 is applied across the cathode-anode circuit of the power device Sp1 substantially equal to E/2, with a diode Da1 completing the connection to the cathode of the device Sp1. At the same time that the commutation device Sca1 is turned on, the commutation device Scb1 is also turned on which causes a reverse bias voltage the commutation capacitor C2 to be applied across the power device Sp1 via the anode-cathode circuit of the commutation device Scb1 and the anode-cathode circuit of a diode Db2, which is connected between the anode of the power device Sp2 and the right side of the capacitor C2. Thus by the firing of the commutation devices Sca1 and Scb1 both power devices Sp1 and Sp2 are commutated off.

A current path is provided for the load current $i_L$ being the commutation period from the position terminal of the source E, the commutation device Sca1, the capacitor C1, the diode Da1, the load Z, a diode Db2, the capacitor C2, the commutation device Scb1 to the negative terminal of the battery E. The polarity of charge across the capacitors C1 and C2 reverses so that the right side of the capacitor C1 will be negative and the right side of the capacitor of C2 will be positive, with the magnitude of the voltage thereacross being substantially equal to E/2. The power devices Sp1 and Sp2 are reversed biased until the time when the charging voltages for the capacitors C1 and C2 cross zero. When the capacitors have charged to the magnitude E/2 of the reversed polarity, the load current $i_L$ will freewheel through the pair of diodes Da1–Db1 and Da2 and Db2. The inductive energy in the inductance of the load Z will thus be dissipated and the voltage across the load Z will be equal to zero with both power devices Sp1 and Sp2 being in their blocked state. The commutation devices Sca1 and Scb1 recover as the current therethrough goes to zero.

Both power devices Sp1 and Sp2 may now be refired in order to sustain a desired average voltage across the load Z, and the current will be supplied in a direction as shown on FIG. 5. When it is again desired to commutate the power devices Sp1 and Sp2, the commutation-controlled switching devices Sca2 and Scb2 are turned on while the devices Sca1 and Scb2 remain in their turned off condition. The commutation device Sca2 connects the capacitor C2 across the power device Sp1 via the diode Da2 to reverse bias the power device Sp1 and thereby turn it off. The power device Sp2 is commutated at the same time by the capacitor C1 being connected thereacross via the commutation device Scb2 and the diode Db1.

Hence, with the commutation of the power devices Sp1 and Sp2, the load current $i_L$ passes through a path including the commutation device Sca2, the capacitor C2, the diode Da2, the load Z, the diode Db2, the capacitor C1 and the device Scb2. The capacitors C1 and C2 will charge the polarity as indicated on FIG. 5 to the magnitude E/2 with the reverse bias appearing across the power devices Sp1 and Sp2 until the charge voltage crosses the zero axis. When the capacitors have charged to the voltage E/2, the load current $i_L$ will freewheel through the diode pairs Da1–Db1 and Da2–Db2 to dissipate the inductive energy in the inductor L of the load Z. The commutation devices Sa2 and Scb2 will revert to their blocking condition with the circuit now being reset for the next cycle of operation when the power devices Sp1 and Sp2 are gated on.

It can thus be seen that through the use of an additional commutation capacitor, two commutation-controlled switching devices and two additional diodes that both power devices Sp1 and Sp2 can be commutated off at the same time thereby only requiring each power device to sustain one-half of the source voltage E and thereby permitting the use of much lower rated power devices.

I claim:

1. In a circuit for supplying a load operative with a DC source having a positive output terminal and a negative output terminal, the combination comprising:

I. first and second power-controlled switching devices each connected between said load and a different one of said output terminals of the DC source for supplying the load when both said power devices are conductive; and II. a commutation circuit comprising:

a. a commutation capacitor chargeable to a first and a second polarity;

b. first conduit means including a first commutation-controlled switching device and a first unidirectional device for selectively connecting said capacitor charged to said first polarity across the then conductive first power-controlled switching device when said first commutation-controlled switching device is turned on to commutate off the first power device, said capacitor charging to said second polarity in response to the turning on of said first commutation controlled switching device; and c. second circuit means including a second commutation-controlled switching device and a second unidirectional device for selectively connecting said capacitor means charged to said second polarity across the then conductive second power-controlled switching device when said second commutation-controlled switching device is turned on to commutate off the second power device, said capacitor charging to said first polarity in response to turning on of said second commutation-controlled switching device.

2. The combination of claim 1 wherein;

a. each of said devices has a cathode and an anode;

b. a first conduit leg is connected across the source ends of said first and second power controlled switching devices and includes said first and second commutation-controlled switching devices connected in series and oriented in the same direction, the anodes of the first power device and the first commutation device being connected together, and the cathodes of the second power device and the second commutation device being connected together;

c. a second circuit leg is connected across the load ends of said first and second power devices and includes said first and second unidirectional devices connected in series and oriented in the same direction, the cathodes of the first power device and the first unidirectional device being connected together, and the anodes of the second power device and the second unidirectional device being connected together; and d. one side of said capacitor is connected to a junction between said first and second commutation-controlled switching devices, the other side of the capacitor being connected to a junction between said first and second unidirectional devices.

3. The combination of claim 2 which includes a DC-to-AC inverter connected between said load and said power devices, said inverter having a plurality of controlled-switching devices for operation in a predetermined pattern to connect DC to AC, said commutation circuit being operative for effecting selective commutation of the last-mentioned switching devices.

4. The combination of claim 2 wherein said first and second unidirectional devices are diodes.

5. The combination of claim 1 which includes a DC-to-AC inverter connected between said load and said power devices, said inverter having a plurality of controlled-switching devices for operation in a predetermined pattern to connect DC to AC said commutation circuit being operative for effecting selective commutation of the last-mentioned switching devices.

6. The combination of claim 1 wherein said first and second unidirectional devices are diodes.

7. The combination of claim 1 wherein:

said first and second unidirectional devices are operatively connected across said load for providing a conductive path for the load current when said first and second power devices are nonconductive.

8. The combination of claim 7 wherein said first and second unidirectional devices are diodes.

9. The combination of claim 8 which includes a DC-to-AC inverter connected between said load and said power devices, said inverter having a plurality of controlled-switching devices for operation in a predetermined pattern to connect DC to AC, said commutation circuit being operative for effecting selective commutation of the last-mentioned switching devices.

10. The combination of claim 1 which includes:

a three-phase inverter operatively connected between said first and second power devices and said load, said inverter includes, a plurality of bridge-controlled switching devices for selectively completing a bidirectional path to said load so that an alternating polyphase output appears thereacross, a plurality of feedback-controlled switching devices respectively associated with each of said bridge controlled switching devices and being in a blocking state associated with said plurality of bridge-controlled switching devices to be commutated off;

said commutation circuit operative for effecting the selective commutation of said bridge-controlled switching devices.

11. The combination of claim 6 wherein:

each of said plurality of feedback devices being complementary to one of said bridge devices other than the associated devices, said complementary feedback devices being selectively turned on to provide a return circuit path to said source when selected of said plurality of bridge devices have been commutated.

12. In a circuit for supplying a load operative with a DC source having a positive output terminal and a negative output terminal;

first and second power-controlled switching devices each connected between said load and a different one of said output terminals of the DC source for supplying the load when both said power devices are conductive;

first and second commutation capacitors respectively chargeable oppositely to first and second polarities with respect to one another;

first circuit means including a first commutation-controlled switching device and a first unidirectional device for selectively connecting said first capacitor when charged to said first polarity with respect to said second capacitor across said first power device to commutate it off when said first commutation device is turned on;

second circuit means including a second commutation-controlled switching device and a second unidirectional device for selectively connecting said second capacitor when charged to said second polarity with respect to said first capacitor across said second power device to commutate it off when said second commutation device is turned on;

said first and second commutation devices being turned on at substantially the same time so that the voltage from said DC source divides between said first and second power devices;

third circuit means including a third commutation-controlled switching device and a third unidirectional device for selectively connecting said first capacitor when charged to said second polarity with respect to said second capacitor across said second power device to commutate it off when said third commutation device is turned on; and fourth circuit means including a fourth commutation-controlled switching device and a fourth unidirectional device for selectively connecting said second capacitor when charged to said first polarity with respect to said first capacitor across said first power device to commutate it off when said fourth commutation device is turned on;

said third and fourth commutation devices being turned on at substantially the same time so that the voltage of said DC source divides between said first and second power devices when being commutated.

13. The combination of claim 12 wherein:

said first and third unidirectional devices and said second and fourth unidirectional devices are respectively connected across said load for providing a conductive path for load current when said first and second power devices have been commutated.

14. The combination of claim 13 wherein said first, second, third and fourth unidirectional devices are diodes.